US011679537B2

(12) United States Patent
Ono

(10) Patent No.: US 11,679,537 B2
(45) Date of Patent: Jun. 20, 2023

(54) METHOD FOR MANUFACTURING FOAM MOLDED BODY

(71) Applicant: KYORAKU CO., LTD., Kyoto (JP)

(72) Inventor: Yoshinori Ono, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 118 days.

(21) Appl. No.: 16/976,817

(22) PCT Filed: Mar. 22, 2019

(86) PCT No.: PCT/JP2019/012042
§ 371 (c)(1),
(2) Date: Aug. 31, 2020

(87) PCT Pub. No.: WO2019/188764
PCT Pub. Date: Oct. 3, 2019

(65) Prior Publication Data
US 2020/0398463 A1    Dec. 24, 2020

(30) Foreign Application Priority Data

Mar. 29, 2018  (JP) .............................. JP2018-065785

(51) Int. Cl.
*B29C 44/50*    (2006.01)
*B29C 49/04*    (2006.01)
(Continued)

(52) U.S. Cl.
CPC .............. *B29C 44/50* (2013.01); *B29C 49/04* (2013.01); *B29C 67/20* (2013.01); *C08J 9/12* (2013.01)

(58) Field of Classification Search
CPC ............ B29C 44/50; B29C 2049/4608; B29C 2049/4602; B29C 2049/4605;
(Continued)

(56) References Cited

U.S. PATENT DOCUMENTS 6,602,063 B1    8/2003  Cardona
2004/0166042 A1*  8/2004  Fukuhara ............ C01B 21/0422
422/600
(Continued)

FOREIGN PATENT DOCUMENTS

EP    3 272 797 A1    1/2018
EP    3 539 749 A1    9/2019
(Continued)

OTHER PUBLICATIONS

International Search Report dated May 28, 2019 of corresponding International Application No. PCT/JP2019/012042; 5 pgs.
(Continued)

*Primary Examiner* — Stella K Yi
(74) *Attorney, Agent, or Firm* — Maier & Maier, PLLC

(57) ABSTRACT

Provided is a method for manufacturing a foam molded body that can make a shape of bubbles close to a perfect circle. According to the present disclosure, a method for manufacturing a foam molded body, including a step of forming a foam parison from a melt-kneaded resin obtained by melting and kneading a raw material resin and a foaming gas in a cylinder of an extruder and molding the foam parison to obtain the foam molded body, wherein the foaming gas contains 0.1 to 1.0% of argon, is provided.

1 Claim, 3 Drawing Sheets

(51) Int. Cl.
 *B29C 67/20* (2006.01)
 *C08J 9/12* (2006.01)

(58) Field of Classification Search
 CPC .......... B29C 2035/048; B29C 44/3402; B29C 49/04; B29C 67/20; C08J 9/12
 See application file for complete search history.

(56) References Cited

U.S. PATENT DOCUMENTS

| | | | |
|---|---|---|---|
| 2007/0151454 A1* | 7/2007 | Marwitz | B01D 53/75 96/7 |
| 2009/0172970 A1* | 7/2009 | Prieto | E01C 13/08 428/17 |
| 2010/0239845 A1* | 9/2010 | Maekawa | C08J 9/0061 428/315.7 |
| 2013/0032963 A1* | 2/2013 | Tokiwa | C08J 9/14 264/51 |
| 2015/0045468 A1 | 2/2015 | Onodera | |
| 2016/0331073 A1* | 11/2016 | Nakano | C08J 9/103 |
| 2016/0333159 A1* | 11/2016 | Onodera | C08J 9/122 |
| 2018/0117823 A1 | 5/2018 | Yusa et al. | |

FOREIGN PATENT DOCUMENTS

| | | |
|---|---|---|
| JP | 2005343776 A | 12/2005 |
| JP | 2012030498 A | 2/2012 |
| WO | 2013114996 A1 | 8/2013 |
| WO | 2017007032 A1 | 1/2017 |

OTHER PUBLICATIONS

The Extended European Search Report dated Apr. 15, 2021, including the Supplementary European Search Report and the European Search Opinion, in connection with corresponding European Application No. 19778168.5 (7pp.).

Office Action dated Jun. 27, 2022 in corresponding European Patent Application No. 1 9778 168.5; 5 pages.

* cited by examiner

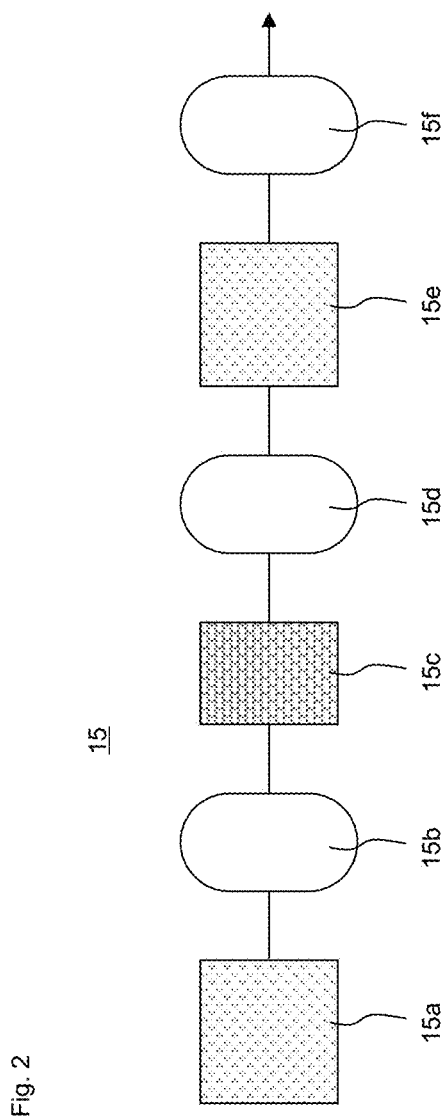

Example 1

Comparative Example 1

METHOD FOR MANUFACTURING FOAM MOLDED BODY

TECHNICAL FIELD

The present invention relates to a method for manufacturing a foam molded body.

BACKGROUND ART

A tubular air conditioning duct for passing air is used, for example, in an air conditioner of an automobile and the like.

A foam molded body using a foamed resin obtained by foaming thermoplastic resin with a foaming gas is known as an air conditioning duct. The foam molded body can achieve both of high heat insulation and light weight, and the demand therefor is increasing.

A widely known method for manufacturing such a foam molded body is a blow molding method in which foamed resin in a molten state is clamped with a split mold, and air is blown into the interior to expand the resin (Patent Literature 1).

CITATION LIST

Patent Literature

Patent Literature 1: JP-A-2012-030498

SUMMARY OF INVENTION

Technical Problem

By the way, the shape of bubbles in the foam molded body is preferably close to a perfect circle because the foam molded body has higher heat insulation as the shape of bubbles approaches a perfect circle. However, the shape of bubbles tends to become longer in the direction along the resin flow, and it is not easy to make the shape of bubbles close to a perfect circle.

The present invention has been made in view of such circumstances and provides a method for manufacturing a foam molded body capable of making the shape of bubbles close to a perfect circle.

Solution to Problem

According to the present invention, a method for manufacturing a foam molded body, comprising a step of forming a foam parison from a melt-kneaded resin obtained by melting and kneading a raw material resin and a foaming gas in a cylinder of an extruder and molding the foam parison to obtain the foam molded body, wherein the foaming gas contains 0.1 to 1.0% of argon, is provided.

As a result of intensive studies by the present inventors, it has been found that the shape of bubbles approaches a perfect circle when the foaming gas contains 0.1 to 1.0% of argon, and the present invention has been derived therefrom.

Hereinafter, various embodiments of the present invention are exemplified. The following embodiments can be combined with each other.

Preferably, in the method described above, the foaming gas contains 98.0 to 99.9% of nitrogen.

Preferably, in the method described above, the foaming gas is a gas obtained by using an adsorbent to remove oxygen from air.

According to another viewpoint of the present invention, provided is a method for manufacturing a foam molded body, comprising a step of forming a foam parison from a melt-kneaded resin obtained by melting and kneading a raw material resin and a foaming gas in a cylinder of an extruder and molding the foam parison to obtain the foam molded body, wherein the foaming gas is a gas obtained by removing oxygen from air with an absorbent.

BRIEF DESCRIPTION OF THE DRAWINGS

FIG. 2 is a detailed configuration of a nitrogen gas generation unit 15 in FIG. 1.

DESCRIPTION OF EMBODIMENTS

Hereinafter, embodiments of the present invention will be described. Various characteristics described in the following embodiments can be combined with each other. In addition, the invention is independently established for each characteristic.

The method for manufacturing a foam molded body according to an embodiment of the present invention comprises a step of forming a foam parison from a melt-kneaded resin obtained by melting and kneading a raw material resin and a foaming gas in a cylinder of an extruder and molding the foam parison to obtain the foam molded body, wherein the foaming gas contains 0.1 to 1.0% of argon.

Figure 1:
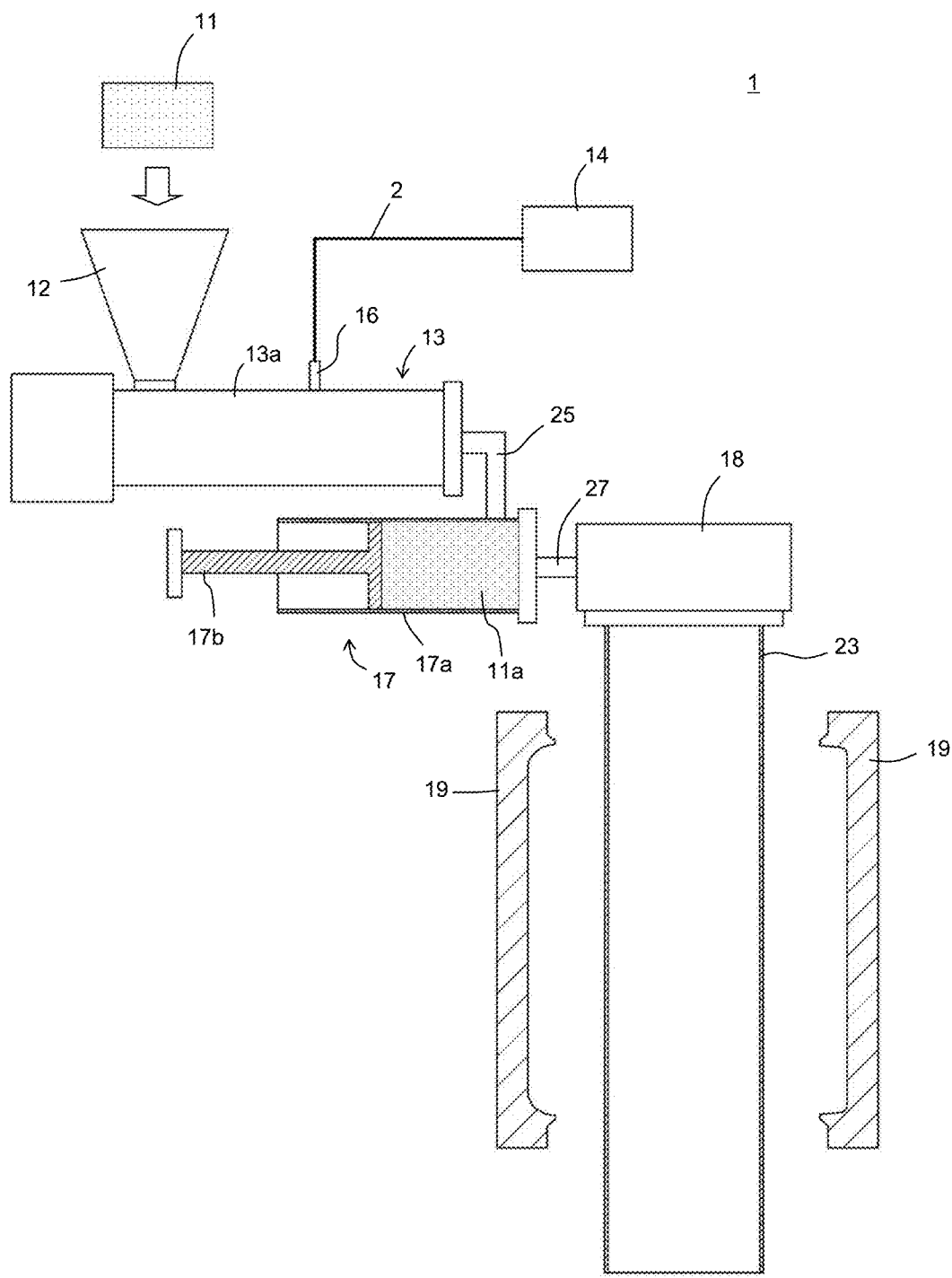
FIG. 1 is an example of a foam blow molding machine 1 that can be used in the method for manufacturing a foam molded body according to the embodiment of the present invention.

The method of this embodiment can be performed using the foam blow molding machine 1 illustrated in FIG. 1. The foam blow molding machine 1 comprises a hopper 12, an extruder 13, an injector 16, an accumulator 17, a head 18, and a split mold 19. The extruder 13 and the accumulator 17 are connected via a joint pipe 25. The accumulator 17 and the head 18 are connected via a joint pipe 27.

Hereinafter, each component will be described in detail.

<Hopper 12, Extruder 13>

The hopper 12 is used to inject the raw material resin 11 into a cylinder 13a of the extruder 13. The form of the raw material resin 11 is not particularly limited, but is typically pellets. The raw material resin 11 is injected into the cylinder 13a from the hopper 12 and then heated and melted in the cylinder 13a to become a molten resin. Further, by the rotation of the screw arranged in the cylinder 13a, the resin is conveyed toward the tip of the cylinder 13a. The screw is arranged in the cylinder 13a and conveys the molten resin while kneading the molten resin by the rotation thereof. A gear device is provided at the base end of the screw, and the screw is driven to rotate by the gear device.

<Injector 16, Gas Supply Device 14, Nitrogen Gas Generation Unit 15, Foaming Gas>

The cylinder 13a is provided with the injector 16 for injecting foaming gas into the cylinder 13a. The gas supply device 14 is connected to the injector 16 via a pipe 2.

The foaming gas is injected into the cylinder 13a through the injector 16 while the pressure and flow rate of the foaming gas are adjusted in the gas supply device 14. The foaming gas is preferably injected into the cylinder 13a in the state of supercritical fluid.

The gas supply device 14 is a device that supplies a foaming gas, and may be a device that supplies a gas from one or a plurality of cylinders as a foaming gas, or may be a device that supplies a gas obtained by extracting a desired component from air as a foaming gas.

The foaming gas only needs to contain 0.1 to 1.0% of argon, and the remaining components include gases contained in air, such as nitrogen, oxygen and carbon dioxide. By performing foam molding using such a foaming gas, the roundness of the bubbles in foam molding is increased.

The argon concentration in the foaming gas is specifically, for example, 0.1, 0.2, 0.3, 0.4, 0.5, 0.6, 0.7, 0.8, 0.9, 1.0%, and may be a value in the range between any two of these values exemplified here. The foaming gas preferably contains 98.0 to 99.9% (preferably 99.0 to 99.9%) of nitrogen. The nitrogen concentration in the foaming gas is specifically, for example, 98.0, 98.1, 98.2, 98.3, 98.4, 98.5, 98.6, 98.7, 98.8, 98.9, 99.0, 99.1, 99.2, 99.3, 99.4, 99.5, 99.6, 99.7, 99.8, 99.9%, and may be a value in the range between any two of these values exemplified here. The total concentration of nitrogen and argon in the foaming gas is, for example, 99 to 100%, specifically, for example, 99, 99.9, 99.99, 99.999, 99.9999, 100% and may be a value in the range between any two of these values exemplified here.

The gas supply device 14 is preferably a nitrogen gas generation unit 15 which removes oxygen from air by using an adsorbent. Oxygen can be efficiently removed by such a nitrogen gas generation unit, but argon is hardly removed or is not removed at all, so that at least a part of argon contained in air remains in the obtained foaming gas. Therefore, the foaming gas containing 0.1 to 1.0% of argon can be obtained without adding argon separately. Examples of the adsorbent include microporous adsorbent such as activated carbon and zeolite.

As shown in FIG. 2, the nitrogen gas generation unit 15 comprises, for example, a compressor 15a, a tank 15b, a nitrogen gas generator 15c, a buffer tank 15d, a compressor 15e, and a buffer tank 15f.

The compressor 15a is a facility for compressing air and is used to obtain a high-pressure air in a manufacturing factory. The tank 15b is a facility for storing the compressed air produced by the compressor 15a. When the factory in which the nitrogen gas generation unit 15 is installed is already equipped with the facility corresponding to the compressor 15a and the tank 15b, it is not necessary to separately prepare the compressor 15a and the tank 15b.

The compressed air stored in the tank 15b is used to operate the nitrogen gas generator 15c. The nitrogen gas generator 15c is a facility that removes oxygen from the compressed air by using an adsorbent. The nitrogen gas is accumulated in the buffer tank 15d after its purity is increased. The compressor 15e is used to increase the pressure of the gas stored in the buffer tank 15d, and the buffer tank 15f is a facility provided to store the gas whose pressure is increased by the compressor 15e.

In addition, since a large amount of the foaming gas is consumed at the start of production (the total consumption is small), branching the pipe 2 and connecting it to a nitrogen cylinder can achieve overall downsizing and can also ensure stability of the facility.

Since the nitrogen gas generator 15c is a facility for removing oxygen from air, it is impossible to obtain a discharge pressure higher than the pressure of raw air for operation The pressure of the air compressed by the compressor 15a is about 0.7 MPa, and the discharge pressure of the nitrogen gas generator 15c is actually about 0.6 MPa. In Japan, when the facility increases the pressure to 1.0 MPa or more, it is regarded as a "high pressure gas production facility" to become difficult to sell. Further, since there is no demand for increasing the pressure of nitrogen to 1.0 MPa or more to consume, there is almost no nitrogen gas generator applicable for increasing the pressure.

On the other hand, the injector 16 is assumed to be supplied with a gas from the cylinder, and therefore requires a gas pressure of 1.5 MPa or more in order to confirm the residual quantity of the gas in the cylinder and to ensure the stability of increasing the pressure. Therefore, the compressor 15e for increasing the pressure is required immediately after the nitrogen gas generator 15c, that is, immediately before the injector 16. If the compressor 15e is too large, the buffer tank 15d becomes empty immediately and stable operation cannot be performed. If the compressor 15e is too small, it takes time to fill the buffer tank 15f. It is necessary to select compressor 15e having an appropriate size.

<Accumulator 17, Head 18>

The melt-kneaded resin obtained by melting and kneading the raw material resin and foaming gas are extruded from a resin extrusion port of the cylinder 13a and injected into the accumulator 17 through the joint pipe 25. The accumulator 17 comprises a cylinder 17a and a piston 17b slidable inside the cylinder 17a, and the melt-kneaded resin 11a can be stored in the cylinder 17a. Then, by moving the piston 17b after a predetermined amount of the melt-kneaded resin 11a is stored in the cylinder 17a, the melt-kneaded resin 11a is extruded through the joint pipe 27 from a die slit provided in the head 18 to form a foam parison 23. The shape of the foam parison 23 is not particularly limited and may be cylindrical or sheet.

<Split Mold 19>

The foam parison 23 is guided between a pair of split molds 19. A foam molded body is obtained by molding the foam parison 23 using the split mold 19. The molding method using the split mold 19 is not particularly limited. The method may adopt blow molding in which the foam parison is molded by blowing air into cavity of the split molds 19, or vacuum molding in which the foam parison 23 is molded by decompressing the cavity of the split molds 19 from an inner surface of the cavity, and may adopt a combination thereof.

EXAMPLES

1. Production of Foam Molded Body

Experimental Example 1

The foam molded body was produced using the foam blow molding machine 1 shown in FIG. 1, and foam moldability was evaluated. The inner diameter of the cylinder 13a of the extruder 13 was 50 mm, and L/D was 34. As the raw material resin, a propylene homopolymer (manufactured by Borealis AG, product name "Daploy WB140") and a long chain branched polypropylene (manufactured by Nippon Polypro Co., product name "EX6000K") at a mass ratio of 30:70 were mixed. 1.0 part by weight of LDPE-based masterbatch (manufactured by Dainichiseika Kogyo Co., Ltd., product name "Finecell Master P0217K") containing 20 wt % of sodium hydrogencarbonate-based foaming agent as a nucleating agent, and 1.0 part by weight of LLDPE-based masterbatch containing 40 wt % of carbon black as a colorant were added to 100 parts by weight of the resin. The temperature of each part was controlled so that the temperature of the foam parison 23 was 190 to 200° C. The number of rotations of the screw was 60 rmm, and the extrusion rate was 20 kg/hr.

As the foaming gas, a gas generated by the nitrogen gas generation unit 15 shown in FIG. 2 was injected into the cylinder 13a via the injector 16. The nitrogen gas generator 15c adopts a PSA system that adsorbs oxygen using a microporous adsorbent. The total concentration of nitrogen and argon was 99.990%. Since the adsorbent removes little or no argon, the argon concentration in the foaming gas of Example 1 is 0.1 to 1.0%.

The foam parison formed under the above conditions was used and placed between split molds for molding a cylindrical molded body. Then, after the split molds were clamped, blow molding was performed by blowing air at a pressure of 0.1 MPa into the foam parison to form a cylindrical foam molded body having the diameter of 50 mm, the height of 100 mm and the thickness of 5 mm.

Comparative Example 1

In Comparative Example 1, a foam molded body was produced in the same manner as in Example 1, except that the gas from the nitrogen gas cylinder, which was filled with the nitrogen gas produced by the cryogenic separation method, was used as the foaming gas.

The total concentration of nitrogen and argon in the foaming gas was 99.995%. Since the cryogenic separation method can remove argon, little or no argon remains in the foaming gas, and its concentration is less than 0.1%.

2. Evaluation

Figure 3A:
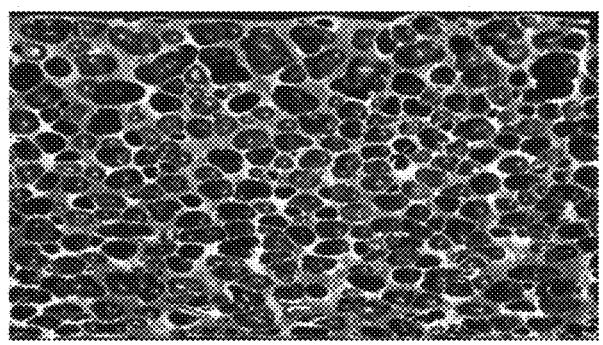
FIG. 3A is a cross-sectional photograph of the foam molded body of Example 1.
Figure 3B:
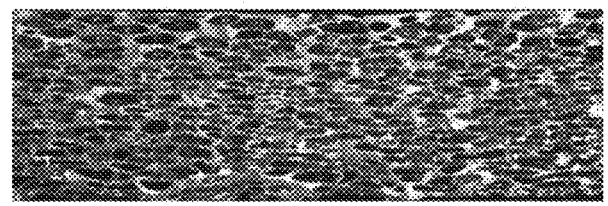
FIG. 3B is a cross-sectional photograph of the foam molded body of Comparative Example 1.

Cross-sectional photographs of the foam molded body of Example 1 and Comparative Example 1 are shown in FIG. 3A and FIG. 3B. As shown in FIG. 3A and FIG. 3B, the foam molded body of Example 1 has a significantly higher roundness of bubbles than the foam molded body of Comparative Example 1.

Furthermore, each of the surface roughness (Ra) in the foam molded bodies of Example 1 and Comparative Example 1 was measured. As a result, the surface roughness (Ra) was 8.5 μm in Example 1 and 9.6 μm in Comparative Example 1. This result indicates that the foam molded body of Example 1 has a smoother surface than the foam molded body of Comparative Example 1.

REFERENCE SIGN LIST

1: foam blow molding machine, 2: pipe, 11: raw material resin, 11a: melt-kneaded resin, 12: hopper, 13: extruder, 13a: cylinder, 14: gas supply device, 15: nitrogen gas generation unit, 15a: compressor, 15b: tank, 15c: nitrogen gas generator, 15d: buffer tank, 15e: compressor, 15f: buffer tank, 16: injector, 17: accumulator, 17a: cylinder, 17b: piston, 18: head, 19: split mold, 23: foam parison, 25: joint pipe, 27: joint pipe

The invention claimed is:

1. A method for manufacturing a foam molded body, comprising
a step of forming a foam parison by melting and kneading a raw material resin and a foaming gas in a cylinder of an extruder to obtain a melt-kneaded resin,
storing the melt-kneaded resin in a cylinder of an accumulator, and
after a predetermined amount of the melt-kneaded resin is stored in the cylinder of the accumulator, moving a piston of the accumulator to extrude the melt-kneaded resin from a die slit provided in a head, and
a step of molding the foam parison using split molds to obtain the foam molded body, wherein the molding is a blow molding in which the foam parison is molded by blowing air into cavity of the split molds, and the foaming gas is a gas obtained by removing oxygen from air with an absorbent, wherein the cylinder is provided with an injector for injecting the foaming gas into the cylinder, the gas supply device is connected to the injector via a pipe, the gas supply device includes a nitrogen cylinder and a nitrogen gas generation unit which removes oxygen from air by using the adsorbent; and the pipe is branched so as to be connected to both of the nitrogen cylinder and the nitrogen gas generation unit.

* * * * *